United States Patent [19]

Ghrist, III

[11] Patent Number: 4,593,364

[45] Date of Patent: Jun. 3, 1986

[54] FLOATING DEADBAND FOR SPEED FEEDBACK IN TURBINE LOAD CONTROL

[75] Inventor: William D. Ghrist, III, Blawnox, Pa.

[73] Assignee: Westinghouse Electric Corp., Pittsburgh, Pa.

[21] Appl. No.: 538,389

[22] Filed: Oct. 3, 1983

[51] Int. Cl.⁴ .............................................. H02P 9/04
[52] U.S. Cl. .................................... 364/494; 364/492; 60/660; 290/40 R
[58] Field of Search ................. 364/14, 300, 492, 493, 364/494, 464; 60/660, 662, 648; 290/40 R, 40 A, 40 C; 415/15, 17

[56] References Cited

U.S. PATENT DOCUMENTS

| 4,053,746 | 10/1977 | Braytenbah et al. | 290/40 R |
| 4,418,285 | 11/1983 | Podolsky et al. | 415/17 |
| 4,461,152 | 7/1984 | Tennichi et al. | 60/660 |
| 4,463,432 | 7/1984 | Carter III | 364/493 |
| 4,464,724 | 8/1984 | Gurr et al. | 364/492 |

Primary Examiner—Parshotam S. Lall
Attorney, Agent, or Firm—D. Schron

[57] ABSTRACT

A speed feedback loop for load control regulation of a steam turbine. A difference between rated and actual turbine speed results in a speed error to which a deadband function is applied. Operation is such that the deadband, rather than being centered about a fixed value, moves as a function of speed error.

5 Claims, 8 Drawing Figures

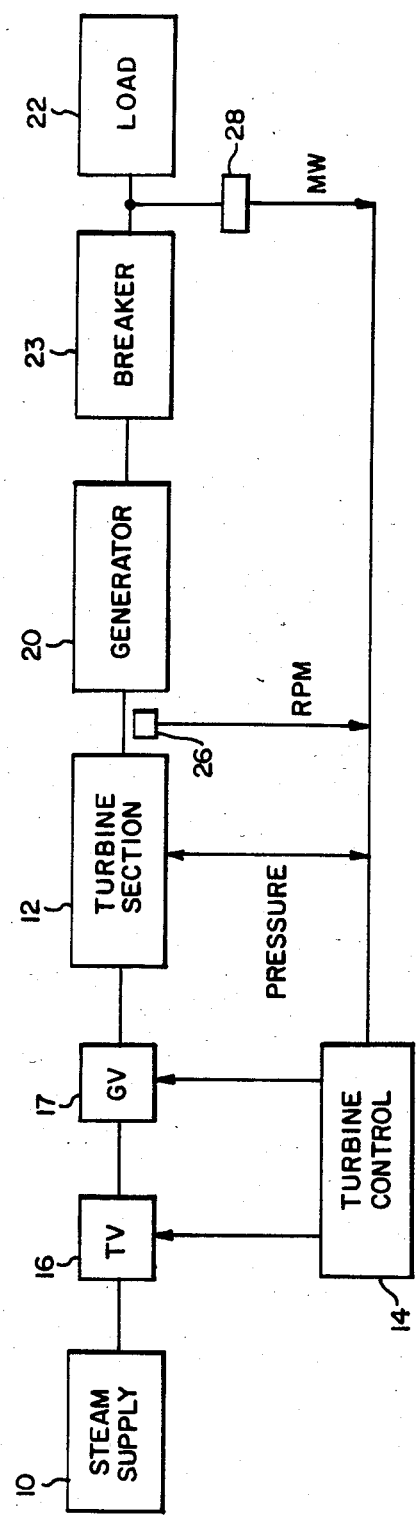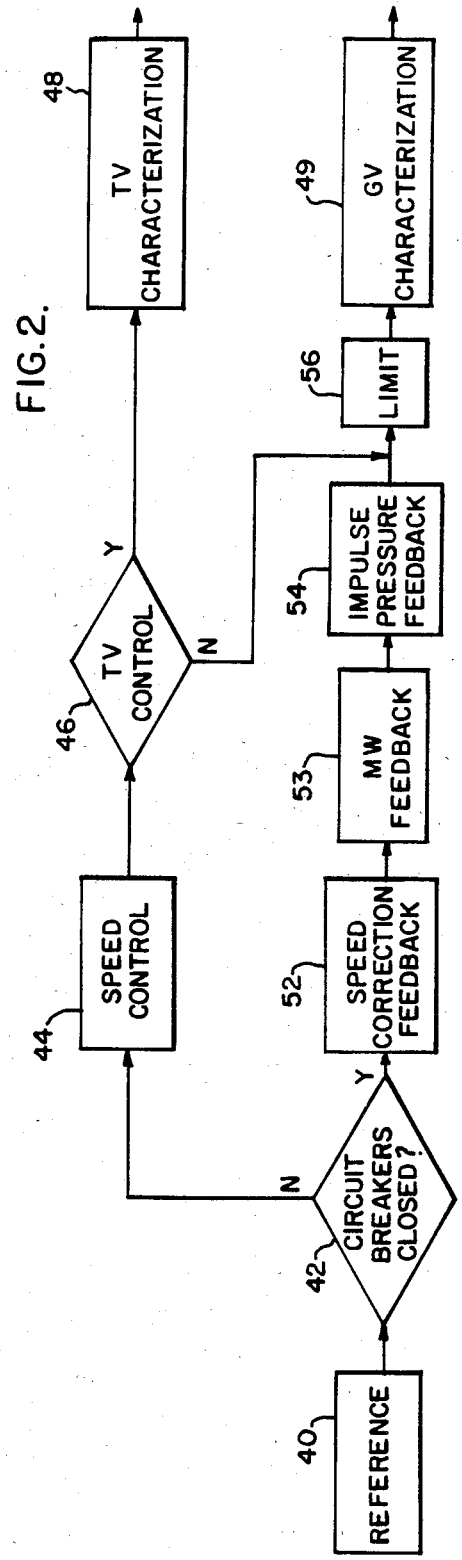

FLOATING DEADBAND FOR SPEED FEEDBACK IN TURBINE LOAD CONTROL

BACKGROUND OF THE INVENTION

1. Field of the Invention:

The invention in general relates to steam turbine control systems, and particularly to a control arrangement wherein a load setpoint is modified in response to changes in power system frequency.

2. Description of the Prior Art:

In the operation of a steam turbine generator power plant, a steam source produces steam which is provided to a turbine system consisting of one or more turbines. The regulation of the steam through the turbine system is governed by the positioning of a plurality of steam admission valves and as the steam expands through the turbine, or turbines, work is extracted and utilized by an electrical generator for producing electricity which is supplied to a power system network through a circuit breaker arrangement.

When the circuit breakers are open, the torque, as produced by the inlet steam, is generally used to accelerate the turbine shaft from turning gear to synchronous speed. As long as the circuit breakers are open the turbine is spinning with no electrical load and it is operative in a speed control mode. Once the shaft frequency is synchronized to the frequency of the power system network, the circuit breakers are closed and power is delivered to the power system network by the generator.

With the circuit breakers closed, the net torque exerted on the turbine rotating assemblies controls the amount of power supplied to the power system network, while shaft speed is governed by the frequency of the power system network. Control of steam inlet under these conditions is generally referred to as load control and during which, the turbine speed is monitored and utilized in a speed feedback arrangement for purposes of regulating the power delivered, by control of the steam admission valves.

In the speed feedback arrangement during load control, the actual turbine speed is compared with the rated turbine speed to generate a speed error signal which is utilized in the control of the steam admission valves. In a typical operation, the power system frequency increases and decreases by small amounts due to constant changes in load, thereby resulting in a corresponding change in turbine speed. In such situation there is a possibility that the steam admission valves would constantly move up and down for small frequency deviations in an attempt to correct the situation. Accordingly, the speed feedback arrangement normally is provided with a deadband such that the speed has to deviate by some predetermined amount before correction is undertaken.

A problem arises in that in actual practice the system frequency, and accordingly the turbine speed, may vary about a value which deviates from the rated speed by an amount exceeding the deadband. For example, during the night there may be less of a demand for power, thus causing the system frequency (and turbine speed) to increase. Conversely, during the day there may be a greater demand for power, thereby causing the system frequency (and turbine speed) to decrease. The deviations may average out to the correct frequency, although, for minutes or even hours the system may be operating above or below rated values.

Such deviations therefore could be considered as normal for the operating conditions and yet the steam admission valves would constantly be moving up and down in response to small frequency deviations. The present invention allows operation at a speed value other than the rated speed and without the objectionable constant movement of the steam admission valves in response to small deviations about the speed value.

SUMMARY OF THE INVENTION

The improved arrangement is utilized in load control of a steam turbine wherein a megawatt reference signal, used to control steam admission valves, is modified in accordance with a speed feedback loop. Means are provided for obtaining a speed error signal indicative of the difference between rated and actual turbine speeds. If the derived speed error signal exceeds a preset speed error deadband, then a corrective signal is generated which is used to modify the megawatt reference value. Anytime a new corrective signal is generated, the speed error deadband is shifted to a corresponding new position.

BRIEF DESCRIPTION OF THE DRAWINGS

FIG. 1 is a simplified block diagram of a steam turbine-generator power plant;

FIG. 2 is a block diagram flow chart illustrating speed and load control of the turbine system;

DESCRIPTION OF THE PREFERRED EMBODIMENT

Figure 3:
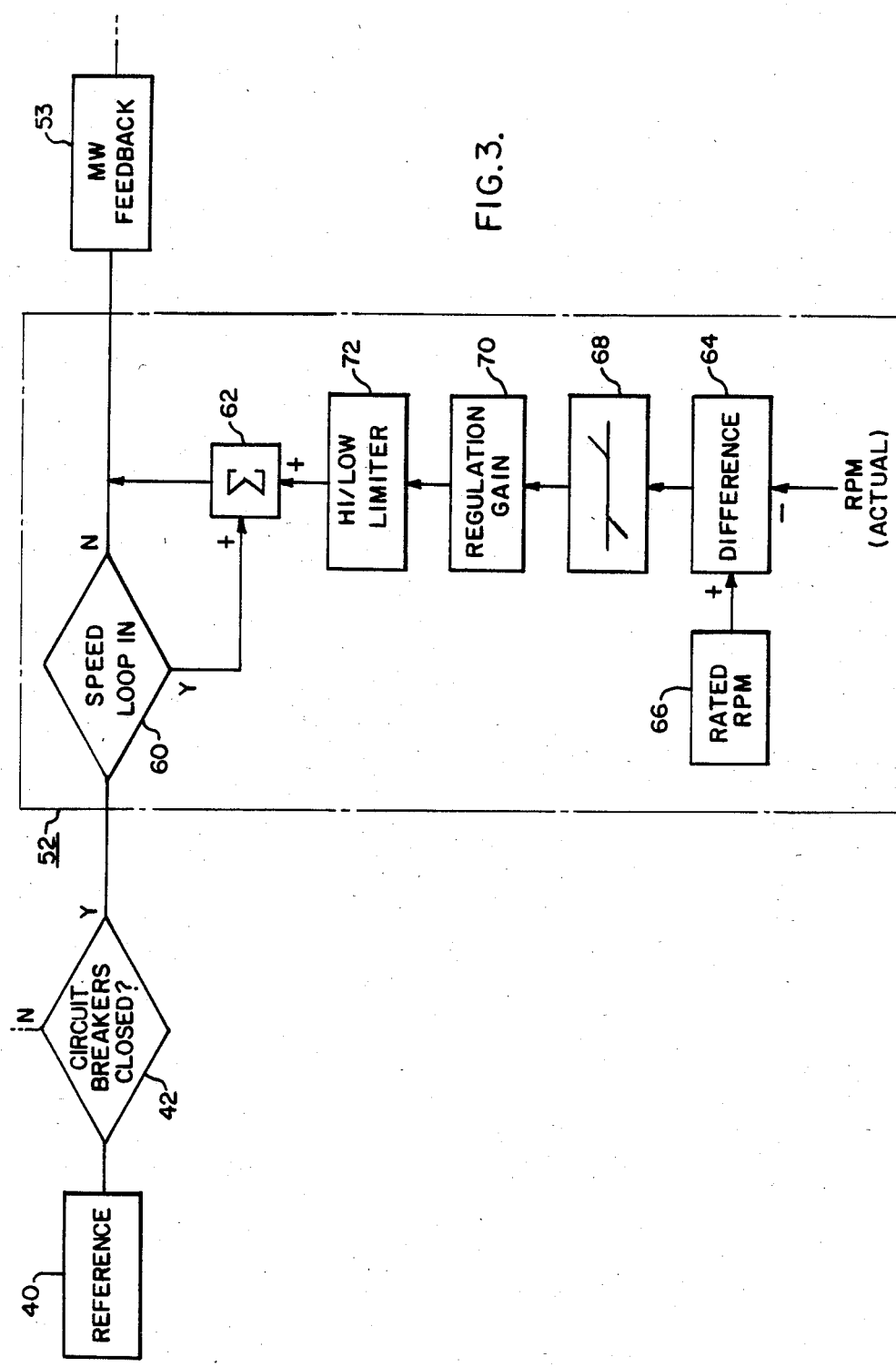
FIG. 3 is a block diagram illustrating the speed correction feedback loop of FIG. 2 in more detail.

FIG. 1 illustrates a simplified diagram of a typical steam turbine-generator power plant. A steam source 10 is operative to generate and supply steam to a turbine arrangement 12 which may consist of a single turbine, or more commonly, a plurality of units such as a high pressure, intermediate pressure and low pressure turbine.

A turbine control unit 14 is operative in response to certain input signals to generate control signals for governing operation of a stop, or throttle valve arrangement 16 and a control, or governor valve arrangement 17 for precisely controlling the steam supplied to the turbine section 12.

The turbines are operable to drive a generator 20 for the production of electricity which is supplied to a load 22 when main circuit breakers 23 are closed. Typically the load 22 may be a power system network which is supplied with electricity from a plurality of such power plants.

Turbine control unit 14 is operable to provide control signals to the throttle and governor valve arrangements 16 and 17 (as well as to stop and interceptor valve arrangements within turbine section 12 in multiple turbine units) in response to certain input signals. These input signals may include certain pressure signals from turbine section 12 as well as a speed signal, RPM, from a speed sensor 26 and a megawatt signal, MW, indicative of output electrical power and derived from a power detector 28.

In a preferred embodiment the turbine control unit 14 is a digital computer control system including various analog-to-digital and digital-to-analog conversion circuits as well as one or more digital computers. One such type of turbine control unit is a DEH (digital electrohydraulic) turbine control system such as described in the January 1974 issue of the *Westinghouse Engineer* and as described in numerous U.S. Patents, a representative number of which include U.S. Pat. Nos. 4,029,255, 4,090,065, 4,220,869, 4,227,093, 4,246,491, 4,258,424, or an improved version of these as described in U.S. Pat. No. 4,368,520, all of which are hereby incorporated by reference.

The speed and load control operation for the DEH is illustrated in simplified form in FIG. 2. Reference 40 is the desired value of the parameter being controlled and is generated in accordance with various computer programs described in the referenced patents. During wide range speed control the reference is the desired value of turbine generator speed and during load control the reference is the desired generator megawatt output.

With reference to decision block 42, if the circuit breakers are not closed, operation is in wide range speed control and speed control function 44 is operable to compare the actual turbine speed (RPM) with the desired turbine speed (reference 40) so as to generate a valve control signal. The throttle valves may control the introduction of steam up until about 90% of rated speed, after which the governor valves take over to control the introduction of steam. Accordingly, and in conjunction with decision block 46, the control signal provided by speed control function 44 is utilized to generate a throttle valve control signal by throttle valve characterization function 48 when in throttle valve control and by a governor valve characterization function 49 when not in throttle valve control.

When the circuit breakers are closed in the load control mode, the load reference is utilized to generate the necessary governor valve position control signals. The value of the generated reference may be further modified by a plurality of feedback loops which may selectively be placed into operation. The feedback loops include a speed correction feedback 52, a megawatt feedback 53 and an impulse pressure feedback 54, with the value of the thus modified reference being limited as indicated by limit block 56.

The speed correction feedback loop 52 is provided with an indication of actual turbine speed and modifies the load reference to make the unit responsive to changes in power system frequency. The present invention is directed to an improved speed correction feedback loop which prevents the governor valves from continuously oscillating in response to small deviations from rated speed even when a speed error has exceeded a predetermined deadband. An embodiment of the present invention is illustrated in FIG. 3 to which reference is now made.

If the speed loop is in, as indicated by decision block 60, the value of the reference is increased or decreased in summer 62 by a certain amount which is a function of the deviation from rated speed. More particularly, difference block 64 generates a signal indicative of the difference between the turbine's rated RPM from block 66 and the turbine's actual RPM as provided by speed measuring circuits. Since power system frequency and accordingly turbine speed may vary somewhat, depending upon power usage, it is possible that the difference signal may vary slightly during operation. In order to prevent these slight variations from unnecessarily moving the governor valves, a deadband function as represented by block 68 is incorporated such that any speed error, that is, the difference between rated and actual speed, must exceed a certain positive or negative value before corrective action takes place. By way of example the deadband may be ±1 RPM.

After the deadband function, the speed error is multiplied, in block 70, by a constant corresponding to a preselected value of speed regulation. The resulting signal is limited to a maximum or minimum predetermined value in block 72 and thereafter added to the reference.

In the present invention the speed deadband of block 68 is caused to move in accordance with the speed error so that the effect of small up and down variations are suppressed at all speeds.

Although the modification to the megawatt reference can be accomplished with discrete circuits such as summers, difference circuits, multipliers, etc., the preferred implementation is by digital computer operation utilizing the computer of the turbine control unit 14 (FIG. 1). An exemplary step-by-step implementation for shifting the deadband curve and deriving a modification to the megawatt reference is as follows:

(1) Determine the values of the variables used and store these values in the computer memory. Thus the computer memory will have stored in it the rated turbine speed, the rated turbine load, the width of the deadband desired, the high and low limits to be employed and the regulation gains, that is, the percentage load change per percentage speed error.

(2) A variable designated as "retained speed error" is initialized to zero. The retained speed error is at the midpoint of the deadband and the initialization has the effect of setting the deadband between $-X$ and $+X$, where X is the value stored in memory and utilized as the deadband value in the following steps.

(3) The speed error is calculated in accordance with:

speed error = rated speed − actual speed (4) A check is then made to see if the speed error falls outside of the deadband:

(4a) if the speed error is greater than the retained speed error plus the deadband, then the old value of retained speed error is replaced with a new value in accordance with:

retained speed error = speed error − deadband (4b) if the speed error is less than the retained speed error minus the deadband, then the old value of retained speed error is replaced with a new value in accordance with:

retained speed error = speed error + deadband

Step 4a or 4b has the effect of shifting the retained speed error to a new value. Since the retained speed error is in the center of the deadband, the deadband likewise moves to a new position.

(5) A value of gain is selected depending upon whether the actual speed is high or low (speed error negative or positive). These two gain values are stored in memory and may either be the same or different from one another, depending upon customer usage. The gain value selected is utilized in the following step.

(6) The speed correction factor which is utilized to modify the MW reference is determined from the following which includes the conversion to megawatt units:

speed correction factor =
$$\text{rate load} \times \text{gain} \times \frac{\text{retained speed error}}{\text{rated speed}}$$

(7) The speed correction factor derived from step 6 is checked to see that it falls within the positive and negative limits stored in memory. If the speed correction factor is outside of the limits, the appropriate positive or negative limit is utilized as the modifying correction factor.

The above steps may be performed by the digital computer during the course of normal turbine control and a new speed correction factor for modifying the load reference may be calculated by way of example every 250 milliseconds for accurate control purposes.

Operation of the present invention may be further explained with reference to FIGS. 4A through 4E. In the Figures, the vertical axis represents the speed correction to be applied, scaled in megawatt units. The horizontal axis represents speed error, that is, the difference between rated and actual RPM as provided by the difference operation of block 64.

Figure 4C:
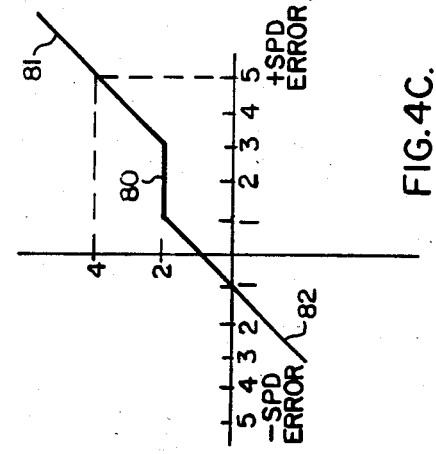
FIGS. 4A through 4E are curves illustrating the operation of the present invention.
Figure 4B:
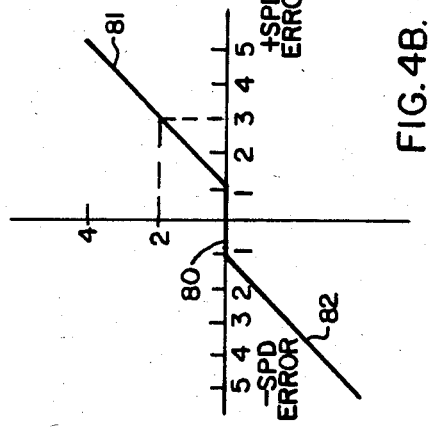
Figure 4A:
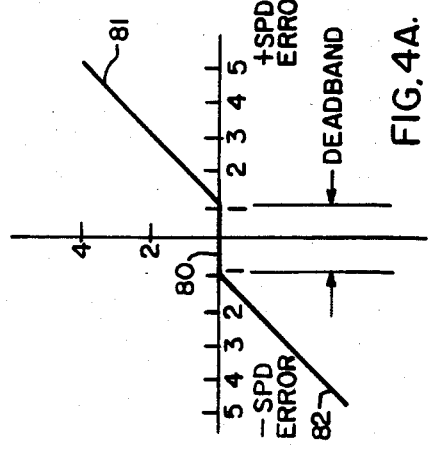

By way of example let it be assumed that the deadband width is 2 RPM ($|x|=1$ RPM), that is, the speed error can deviate in deadband portion 80 of FIG. 4A from −1 to +1 RPM without any corrective action being taken. The retained speed error is zero on the horizontal speed error axis due to the initialization of above step (2). If the speed error increases past 1 RPM then corrective action is taken as determined by the positive going portion 81 of the curve, with the amount of correction taken being dependent upon the slope thereof and the function being implemented by the gain operation of block 70. If the speed error increases in a negative direction past −1 RPM, corrective action will then be taken as determined by the slope of the negative going portion 82 of the curve. The slopes of curve portions 80 and 82 are equivalent to the gain factors and, as noted in step (5), may be identical or different from one another.

Let it be assumed that the actual turbine speed is equal to the rated turbine speed and that there is a greater demand for power such that the system frequency decreases slightly with a resulting decrease of 3 RPM in actual turbine speed. In such instance, and as illustrated in FIG. 4B, there will be a speed error of +3 RPM (since speed error=rated speed−turbine speed) causing a resulting megawatt correction of 2 units magnitude. If operation is such that the speed error persists for any length of time, any slight deviation from this new established operating speed will cause constant corrections to be made to the reference and accordingly constant movement of the steam admission valves. In accordance with the present invention the curve shifts, as set forth in step (4a) and as illustrated in FIG. 4C, so that the retained speed error is now 2, centered in the deadband 80 which lies between +1 and +3 RPM, thereby still providing the necessary 2 units of megawatt correction as in FIG. 4B, but which will allow a decrease of 2 RPM in the speed error without any further corrective action being taken.

Figure 4E:
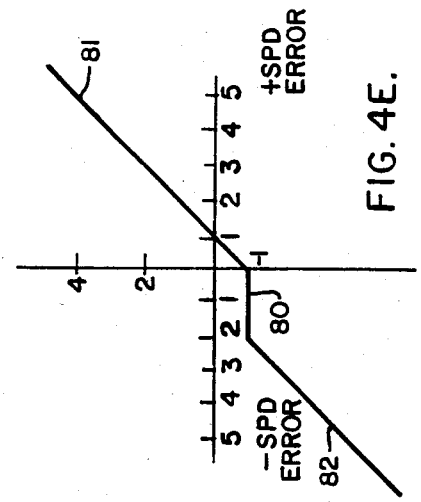
Figure 4D:
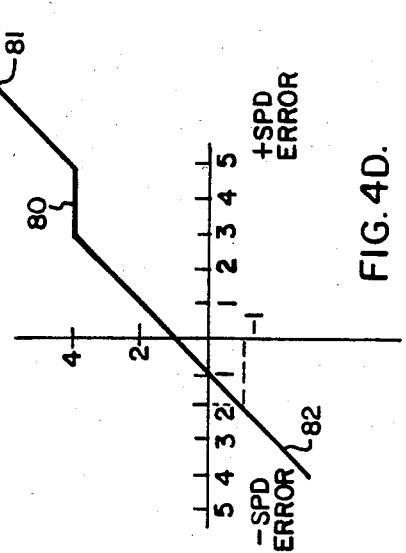

If the speed error should increase, for example, to +5 RPM, then, as illustrated in FIG. 4C, a correction of 4 units is applied and the curve moves up to accommodate the new established speed, as illustrated in FIG. 4D wherein it is seen that any decrease in speed error by less than 2 RPM will still maintain the same corrective and any increase in speed error will cause a further shifting of the curve as previously explained. At this point retained speed error is 4.

Suppose now that a transition in usage takes place such that less power is demanded, causing an increase in system frequency and turbine speed to a point where the actual turbine speed is 2 RPM greater than the rated speed. As illustrated in FIG. 4D, the result is a negative speed error of 2 RPM resulting in a corrective megawatt value of −1 unit. Since the new speed error of −2 RPM is less than the old retained speed error of 4 RPM minus the deadband value of 1 RPM, the new retained speed error becomes −1 RPM in accordance with step (4b) and operation is such that the curve now shifts down so that the deadband 80 lies between −2 and 0 RPM, as illustrated in FIG. 4E.

Further operation in accordance with the enumerated steps provides for substantially continuous megawatt reference correction, when needed, in such a way that the deadband moves with speed error instead of remaining centered around a zero error value. This operation allows small deviations in speed error at times of power frequency deviation without the constant movement of the steam admission valves.

I claim:

1. In a steam turbine-generator power system operable in a speed and load control mode of operation and wherein a load reference setpoint is generated to control steam admission valves to the turbine during load control and wherein said turbine has a rated speed, the improvement comprising:
   (A) means for obtaining an indication of actual turbine speed;
   (B) means for obtaining a speed error signal indicative of the difference between rated and actual turbine speed;
   (C) means for generating a corrective signal if said speed error signal exceeds a preset speed error deadband;
   (D) means for shifting said deadband each time a new corrective signal is generated; and
   (E) means for modifying said load reference setpoint by said corrective signal.

2. Apparatus according to claim 1 wherein:
   (A) said deadband is initially centered around a zero RPM speed error.

3. Apparatus according to claim 1 wherein:
   (A) said means for shifting shifts said deadband such that said new corrective signal is continuously provided as long as said speed error remains within said deadband.

4. Apparatus according to claim 1 wherein:
   (A) said means for shifting shifts said deadband so that one limit thereof is coincident with the speed error causing said shift.

5. In a steam turbine-generator power system operable in a speed and load control mode of operation and wherein a load reference setpoint is generated to control steam admission valves to the turbine during load control and wherein said turbine has a rated speed, the improvement comprising:
   (A) means for obtaining an indication of actual turbine speed;

(B) means for obtaining a speed error signal indicative of the difference between rated and actual turbine speed;
(C) means for establishing a speed error deadband of ±X RPM;
(D) means for establishing a retained speed error and initializing said retained speed error to zero;
(E) means for replacing said retained speed error with a new value equal to the value of said speed error minus X, if said speed error is greater than the previous retained speed error plus X and replacing it with a new value equal to the value of said speed error plus X if said speed error is less than the previous retained speed error minus X;
(F) means for applying a predetermined gain factor to said retained speed error and generating a corrective signal; and
(G) means for adding said corrective signal to said load reference setpoint.

* * * * *